Patented Oct. 25, 1938

2,133,969

UNITED STATES PATENT OFFICE 2,133,969

THIAZOLE COMPOUNDS AND METHODS OF MAKING THEM

Edwin R. Buchman, New York, N. Y., assignor to Research Corporation, New York, N. Y., a corporation of New York No Drawing. Application March 18, 1935, Serial No. 11,682

7 Claims. (Cl. 260—302)

This invention relates to thiazole compounds and methods of making them, and more particularly to thiazole compounds suitable for use in the synthesis of the antineuritic vitamin and methods of making such compounds.

In an article entitled "Structure of vitamin B" by R. R. Williams, which was published in the Journal of the American Chemical Society, vol. 57, page 229 (1935), the probable structural formula of the antineuritic vitamin, also known as vitamin B and vitamin B₁, is disclosed. This vitamin is useful as a therapeutic agent in the treatment of certain diseases, among which is beriberi. It is also useful as a supplement to certain foodstuffs for the promotion of growth and well being of animals including man. It has been found that this vitamin is a chemical compound which comprises a thiazole derivative and a pyrimidine derivative in chemical combination.

An object of the invention is to provide thiazole compounds, and particularly those which are useful in the synthesis of the antineuritis vitamin or similar compounds.

A further object of the invention is to provide useful and effective methods of producing thiazole compounds of the types described.

The present invention relates to the synthesis of thiazole derivatives or their salts which resemble or comprise the thiazole portion of the vitamin B₁ and which may be intermediates suitable for combining with pyrimidine groups or groups capable of being converted into pyrimidine groups to form the antineuritic vitamin or related compounds.

Thiazole compounds embodying the invention have the general formulae:

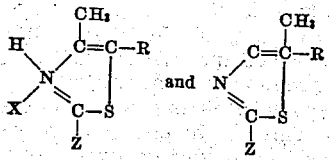

in which X represents an ionic halogen or an acid radical, Z is hydrogen, an amino group, a sulfhydryl group or other group capable of being easily converted into or replaced by hydrogen, and R is the group CH₂CH₂OH or another group, such as CH₂COOH, CH₂CHO, CH₂COOC₂H₅, or the like, which can be replaced by or converted into CH₂CH₂OH. Compounds of the first type, which are termed salts of thiazole derivatives, may be prepared by condensing a halogen ketonic compound of the type CH₃COCHXR, in which X is a halogen, such as bromine, chlorine or iodine, and R has the same meaning as above, with a thio amide compound of the type ZCSNH₂, in which Z has the same significance as above. The reaction which takes place is believed to be represented by the following equation:

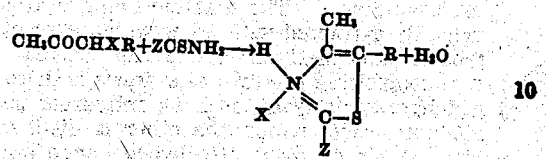

Compounds of the second type, which are known as thiazole derivatives, may be readily prepared by removing the acids from the salts of these derivatives.

It is to be understood that the term "thiazole compounds" as used herein and in the annexed claims, is intended to include both the above described salts of thiazole derivatives and the thiazole derivatives themselves. Also the term "thiazole salts" means the salts of the thiazole derivatives mentioned above.

A specific example, which will illustrate to persons skilled in the art how the invention may be practiced, is the condensation of thio formamide, HCSNH₂, with the brom aceto propyl alcohol having the formula, $$CH_3COCHBrCH_2CH_2OH.$$

Thio formamide is usually made by introducing formamide, HCONH₂, and phosphorous pentasulphide, P₂S₅, into dry ether, shaking or allowing the mixture to stand and removing the ether by distillation. The brom aceto propyl alcohol, which may also be designated 3 brom 3 aceto propan 1 ol, may be prepared in accordance with my process described in the copending application, Serial No. 11,683, filed March 18, 1935.

In the process covered by this copending application, bromine is added to a water solution of 3 aceto propan 1 ol and in the ensuing reaction 3 brom 3 aceto propan 1 ol is produced.

In this process the requisite weights of thio formamide and the above described brom aceto propyl alcohol are dissolved in alcohol and the solution allowed to stand, after which the product is purified by suitable operations. In practice it has been found that satisfactory results may be obtained by dissolving about 23 grams of crude thio formamide and 16 grams of the brom aceto propyl alcohol in 30 cubic centimeters of absolute alcohol and allowing the mixture to stand for 24 hours at room temperature. The resulting product, an impure thiazole salt having the formula:

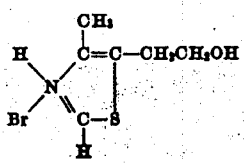

is soluble in water but insoluble in ether. After the mixture has stood the required length of time, 100 cc. of water and 200 cc. of ether are added and the material allowed to stand whereupon the mixture separates into two layers, the lower layer comprising an impure water solution of the thiazole salt and the upper layer comprising impure ether. The lower layer is separated from the ethereal layer and the thiazole salt contained therein is removed therefrom by any suitable operations such as are well known in the art.

A satisfactory method of obtaining a pure product from the water solution of the thiazole salt comprises adding an alkali, such as sodium hydroxide, to the water solution to liberate the thiazole derivative from its combination with hydrobromic acid. The alkaline liquid is then repeatedly extracted with ether which extracts the free thiazole derivative, and the ethereal solution comprising the several extracts is dried over a dehydrating agent, such as anhydrous sodium sulphate, after which the ether is distilled off. The remaining oil is distilled in vacuo and the distillate collected. The distillate, a clear, viscous oil having a faint basic odor and boiling at 100° C. under a pressure of about 1 mm. of mercury, is 4-methyl 5-(β-hydroxy ethyl) thiazole, which has the graphic formula:

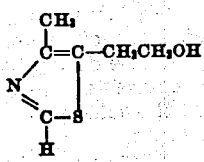

About 3 grams of this thiazole derivative are produced when the above mentioned quantities of brom aceto propyl alcohol and thio formamide are employed. When the material is to be made in quantities, it will be obvious that larger amounts of these ingredients should be used.

This material forms addition products with acids, such as hydrohalic acids, in which the acids are added directly to the nitrogen of the thiazole nucleus to form pentavalent nitrogen compounds, which are termed salts. These salts have the general formula:

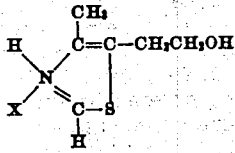

where X is an acid radical or a halogen. When picrolonic acid dissolved in methyl alcohol is added to a water solution of one of these thiazole salts, a characteristic crystalline picrolonate results which decomposes on heating to 184° C. The salts of these thiazole compounds are crystalline materials that are usually soluble in water but insoluble in ether, and form valuable intermediate products for the production of the antineuritic vitamin, or similar compounds.

By suitable reactions a pyrimidine derivative, or a compound capable of being converted into such a derivative, may be caused to affix itself to the nitrogen atom in one of the above described thiazole compounds and thereby produce a product analogous to the antineuritic vitamin in which the pyrimidine and thiazole nuclei are in chemical combination.

Although in the specific embodiment of the invention which has been described, a brom aceto propyl alcohol is the halogen derivative employed, other similar halogen compounds may be used. For example, the corresponding chlor aceto propyl alcohol, 3 chlor 3 aceto propan 1 ol, may be caused to react with thio formamide to produce

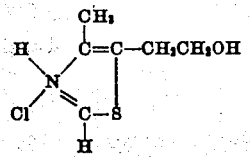

which corresponds to the thiazole salt containing bromine previously described. The chlor aceto propyl alcohol employed in this reaction may be made by direct chlorination of the aceto propyl alcohol. The 3 brom and 3 chlor derivatives of 3 aceto propan 1 ol may also be prepared by hydrolizing the α brom and α chlor derivatives of α acetobutyro-lactone. In this connection, see Jour. Amer. Chem. Soc., vol. 58, p. 1803 (1936). This invention also contemplates the production of thiazole compounds containing iodine from the corresponding halogen ketonic compound containing iodine. The 3 iodo derivative of 3 aceto propan 1 ol may be prepared by suitable adaptations of the methods of preparing the bromine and iodine derivatives referred to hereinabove.

The invention embraces the production of thiazole compounds by condensing compounds of the general type $CH_3COCHXR$, in which X is a halogen and R may be the group $CH_2CH_2OH$, or a group which may be converted into or replaced by $CH_2CH_2OH$, with compounds of the type $ZCSNH_2$, in which Z is hydrogen, an amino group, a sulfhydryl or other group which may be readily converted into or replaced by hydrogen. The kind of reaction which occurs when R is $CH_2CH_2OH$ and Z is hydrogen has already been described. By analogous reactions related compounds, in which R represents a group, such as $CH_2COOH$, $CH_2CHO$, $CH_2COOC_2H_5$, or the like, and Z is an amino or a sulfhydryl group, may be prepared. If desired, these compounds may be converted into derivatives in which R is $CH_2CH_2OH$ and Z is hydrogen by suitable reactions well known in the art. For example, the groups $CH_2COOH$, $CH_2CHO$ and $CH_2COOC_2H_5$, may be converted into $CH_2CH_2OH$ by reduction. An amino group may be converted into hydrogen by treatment with nitrous acid, and a sulfhydryl group may similarly be converted or replaced by the action of an oxidizing agent, such as nitric acid or hydrogen peroxide.

It will of course be understood that other solvents and reagents may be employed to assist in carrying out the reactions and to purify the products obtained. Furthermore, it may be necessary to vary the relative proportions of the ingredients, the time and/or temperature of the reactions in accordance with the particular derivative which is to be produced. These variations are such as are clearly understood by those familiar with the art.

What is claimed is:

1. The method of making thiazole compounds which comprises condensing thio formamide with a compound having the formula $CH_3COCHXR$, in which X represents a halogen of the group consisting of bromine, chlorine and iodine and R is one of the groups $CH_2CH_2OH$, $CH_2COOH$, $CH_2CHO$ and $CH_2COOC_2H_5$.

2. The method of making thiazole compounds, which comprises condensing a compound having the formula $CH_3COCHXR$, in which X represents a halogen of the group consisting of bromine, chlorine and iodine and R is one of the groups $CH_2CH_2OH$, $CH_2COOH$, $CH_2CHO$ and
$$CH_2COOC_2H_5$$
with thio formamide, and treating the resulting compound to convert the group represented by R into $CH_2CH_2OH$.

3. The method of making thiazole compounds, which comprises condensing 3 brom 3 aceto propan 1 ol with thio formamide.

4. The method of making thiazole compounds, which comprises condensing 3 chlor 3 aceto propan 1 ol with thio formamide.

5. The method of making thiazole compounds which comprises condensing a compound having the formula $CH_3COCHXCH_2CH_2OH$, in which X represents a halogen of the group consisting of bromine, iodine and chlorine, with thio formamide.

6. The method of making thiazole compounds which comprises condensing a compound having the formula $CH_3COCHXCH_2CH_2OH$, in which X represents a halogen of the group consisting of iodine, bromine or chlorine, with thio formamide and treating the resulting product with an alkali.

7. The method of making thiazole compounds which comprises condensing 3 iodo 3 aceto propan 1 ol with thio formamide.

EDWIN R. BUCHMAN.